United States Patent [19]

Langmade et al.

[11] Patent Number: 5,686,953
[45] Date of Patent: Nov. 11, 1997

[54] IMAGING SYSTEM AND METHOD USING LINEAR PERCEIVED OPTICAL DENSITY INTERFACE

[75] Inventors: Todd G. Langmade, Mahtomedi; Mark J. Giebler, New Scandia, both of Minn.

[73] Assignee: Minnesota Mining and Manufacturing Company, St. Paul, Minn.

[21] Appl. No.: 343,343

[22] Filed: Nov. 22, 1994

[51] Int. Cl.$^6$ ............................ B41J 2/47; H04N 1/21
[52] U.S. Cl. .......................... 347/253; 347/237; 347/247; 395/118
[58] Field of Search ........................ 347/247, 237, 347/253; 395/118

[56] References Cited

U.S. PATENT DOCUMENTS

| | | | |
|---|---|---|---|
| 5,117,119 | 5/1992 | Schubert et al. | 250/559 |
| 5,281,979 | 1/1994 | Krogstad | 346/108 |
| 5,300,381 | 4/1994 | Buhr et al. | 430/30 |
| 5,321,524 | 6/1994 | Yanagita | 358/455 |
| 5,341,228 | 8/1994 | Parker et al. | 358/534 |
| 5,481,657 | 1/1996 | Schubert et al. | 395/118 |
| 5,528,704 | 6/1996 | Parker et al. | 382/297 |

FOREIGN PATENT DOCUMENTS

| | | | |
|---|---|---|---|
| 0 599 261 A1 | 6/1994 | European Pat. Off. | H04N 1/40 |
| 0 620 678 A1 | 10/1994 | European Pat. Off. | H04N 1/40 |
| WO 92/03855 | 3/1992 | WIPO | H01N 1/46 |
| WO 92/06557 | 4/1992 | WIPO | H04N 1/46 |

*Primary Examiner*—Mark J. Reinhart
*Attorney, Agent, or Firm*—William K. Weimer

[57] ABSTRACT

An imaging system and method employ a linear perceived optical density interface that produces a substantially linear relationship between digital image values generated by an input imaging device and perceived optical densities of corresponding pixels within a visible representation of the image on film. The interface produces a linear change in perceived optical density in response to a linear change in the digital image values, enabling a system user to achieve predictable changes in appearance characteristics by simply adjusting the digital image values. The user can adjust the appearance characteristics in a flexible manner, without being constrained to a set of fixed transfer functions. The user can also perform desired formatting of the image at the input imaging device. The interface provides a single transfer function that is commonly applicable different input imaging devices, such that development of modality-specific transfer functions is unnecessary. The interface also eliminates the extensive hardware previously necessary for supporting a fixed set of transfer functions and formatting options, reducing cost and complexity.

17 Claims, 4 Drawing Sheets

IMAGING SYSTEM AND METHOD USING LINEAR PERCEIVED OPTICAL DENSITY INTERFACE

FIELD OF THE INVENTION

The present invention relates to imaging systems, and, more particularly, to systems for processing image information communicated between an input imaging device and a output imaging device in a imaging system.

DISCUSSION OF RELATED ART

An imaging system typically includes an input imaging device that generates image information representative of an image, and an output imaging device that forms a visible representation of the image based on the image information. In a medical imaging system, the input imaging device may include a diagnostic device, such as a magnetic resonance (MR), computed tomography (CT), conventional radiography (X-ray), or ultrasound device, each of which may be made by one of several manufacturers. An input imaging device of a particular type, and made by a particular manufacturer, will be generally referred to herein as a particular "modality." The output imaging device typically includes a continuous tone laser imager.

The image information generated by the modality contains digital image values. Each of the digital image values corresponds to one of a plurality of pixels in the original image, and represents an optical density associated with the respective pixel. The laser imager processes the digital image values to generate laser drive values. Each of the laser drive values represents a exposure level necessary to accurately reproduce, on a imaging media such as photosensitive film, the optical density of a pixel in the original image. The laser drive values modulate the intensity of a scanning laser to expose the film with a particular level of exposure. The film subsequently is developed, either by wet chemical processing or dry thermal processing, to form a visible representation of the original image.

The laser imager generates the laser drive values by applying one of a plurality of transfer functions to the digital image values. Each of the transfer functions essentially represents the relationship between the digital image values and the optical density associated with corresponding pixels in the visible representation of the image. Thus, the digital image values are the input for the transfer function, and the optical densities on the film are the output. The transfer functions typically are realized by a set of lookup tables stored in a memory associated with the laser imager. The lookup tables map the digital image values to corresponding laser drive values to realize a transfer function. The mapping operation compensates for the nonlinear relationship between the digital image values and the appearance of visible representations of the digital image values to the human observer, as well as the nonlinear sensitometric response of the film to different exposure levels. In addition, the mapping operation is designed to produce particular appearance characteristics in the visible representation of the image. The appearance characteristics typically relate to contrast and/or density levels in the image, but may include other characteristics. A user can select a desired contrast and/or density level by manually actuating controls at a user interface associated with the laser imager. In response, the laser imager selects a corresponding transfer function and applies the appropriate lookup table to the digital image values received from the modality.

In existing medical imaging systems, the laser imager typically provides only a limited number of fixed transfer functions to the user. Unfortunately, the availability of only a limited number of fixed transfer functions offers insufficient flexibility to many users, and presents several disadvantages. For example, the transfer functions available from the laser imager may be incapable of producing particular image characteristics required by the user. As an illustration, a radiologist may require that an image produce a certain appearance, such as highlighting of an area, to reveal important information for diagnostic purposes. If none of the fixed transfer functions provided by the laser imager is capable of producing such an appearance, the diagnostic value of the image is impaired. Another disadvantage is that the fixed transfer functions typically are configured according to the characteristics of a particular modality. If the characteristics of the modality are incorrect or subject to change, the fixed appearance transfer functions can produce uncertain results. Moreover, if the modality is "swapped" with another type of modality having different characteristics, the fixed transfer functions become inapplicable.

Further, the limited number of fixed transfer functions available from the laser imager may provide a level of gradation between transfer functions that is unacceptable to the user. For example, a user desiring the ability to select among fine gradations of contrast or density for an image may have access to only a coarse set of gradations available from the transfer functions provided in the laser imager. In addition, the response of the film may produce a visible representation of the image that does not match the image viewed by the system user on a monitor. A radiologist may invest a significant amount of time to mean and window a set of images using the monitor, only to find that the visible representation of the image on the film does not match the image displayed on the monitor. Finally, in a network configuration having several different modalities and one or more laser imagers, an increased number of transfer functions must be provided in the laser imager to accommodate the characteristics of different modalities. The development of a large number of modality-specific transfer functions can be cumbersome and inefficient. In addition, the hardware necessary to implement the specific transfer functions can be expensive.

The laser imager may provide a number of additional formatting operations that require manipulation of the digital image values. The formatting operations may include, for example, magnification or reduction of the size of an image, adjustment of the orientation of the image, definition of borders for the image, and mapping of a plurality of different images onto areas of a single sheet of film. Like the transfer functions discussed above, the formatting operations typically are limited to a fixed set that may provide insufficient flexibility for some imaging applications. The inflexibility of the formatting choices may frustrate the efforts of a radiologist to achieve a desired appearance. In addition, the formatting operations further complicate the hardware required by the laser imager.

The inflexibility and cost associated with the limited number of transfer functions and formatting operations available in existing medical imaging systems presents a need for an improved medical imaging system. In particular, there is a need for a more flexible medical imaging system that provides users with the ability to custom-define transfer functions and formatting operations while, at the same time, ensuring a reproducible and stable system transfer function. As a further improvement, a reduction in the complexity and cost of laser imager hardware necessary for implementation of the various transfer functions would be desirable.

SUMMARY OF THE INVENTION

In view of the foregoing limitations associated with existing medical imaging systems, the present invention is directed, in a first embodiment, to a digital laser imaging system having a linear perceived optical density interface. In a second embodiment, the present invention is directed to a digital laser imager having a linear perceived optical density interface. In a third embodiment, the present invention is directed to a digital laser imaging method using a linear perceived optical density interface. A direct linear perceived optical density interface provides a number of advantages.

For example, the digital laser imager offers a significant degree of added flexibility to a system user at the modality. Because the digital laser imager produces a known, linear change in perceived optical density in response to a linear change in digital image values, a system user at the modality can achieve predictable changes in appearance characteristics by simply adjusting the digital image values via a user input device. In this manner, the system user can adjust the appearance characteristics according to its needs, without being constrained to a set of fixed transfer functions, as would be required by previously existing laser imagers. Similarly, the system user can pre-format the digital image values at the modality before sending them to the laser imager.

In addition, the linear perceived optical density system transfer function provides a single transfer function that is commonly applicable to digital image values generated by any of a plurality of different input imaging devices. Consequently, the digital laser imager is "decoupled" from the characteristics of a particular modality, such that development of several modality-specific transfer functions is unnecessary. The linear perceived optical density system transfer function simply requires that the resolution of the digital image values generated by different input imaging devices be linearly based.

Further, because the system user is capable of adjusting the digital image values on an ad-hoc basis to achieve desired appearance characteristics, the levels of gradation, e.g., for contrast, are limited only by the resolution of the digital image values. If a monitor associated with the modality is also configured to display a visible representation of the image based on a linear relationship between perceived optical density and the digital image values, the system user can rely on the monitor as an indication of the appearance characteristics and formatting of the visible representation that will be produced on film by the digital laser imager.

Finally, because the system user makes changes in appearance characteristics and formatting at the modality, via a user input device, the extensive hardware previously necessary for supporting a set of fixed transfer functions and a set of fixed formatting operations is eliminated, reducing the cost and complexity of the digital laser imager. Although the digital imaging system delegates responsibility for adjusting appearance characteristics and formatting to the modality, such delegation does not simply redistribute cost to the modality. Rather, most modalities already possess sufficient computing power, ordinarily provided by a workstation, for a user to manipulate the digital image values for desired appearance characteristics.

Additional features and advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

To achieve the foregoing advantages, as broadly embodied and described herein, the present invention provides, in a first embodiment, a digital laser imaging system comprising an input imaging device for generating a plurality of digital image values representative of an image, each of the digital image values representing an optical density of the image at one of a plurality of pixels within the image, a user input device, coupled to the input imaging device, for receiving input from a system user, the input including adjustments to the plurality of digital image values to modify one or more appearance characteristics associated with the image, and a laser imager for forming, based on the plurality of digital image values, a visible representation of the image on photosensitive film, the laser imager including a scanning laser for exposing the film to form the visible representation of the image on the film, the scanning laser being operative in response to a plurality of laser drive values, wherein each of the plurality of laser drive values controls an exposure level of the scanning laser at one of a plurality of pixels within the visible representation of the image on the film, a memory for storing a conversion table, the conversion table mapping each of the digital image values to a corresponding one of the plurality of laser drive values according to a system transfer function such that a substantially linear relationship is produced between each of the digital image values and a perceived optical density of one of the pixels corresponding to the respective one of the digital image values within the visible representation of the image on the film, and a processor for accessing the memory, converting the digital image values into the laser drive values based on the conversion table, and controlling the exposure level of the scanning laser based on the laser drive values to form the visible representation of the image on the film.

In a second embodiment, the present invention provides a digital laser imager for forming a visible representation of an image on a photosensitive film based on a plurality of digital image values generated by an input imaging device, the digital image values being representative of an image, wherein each of the digital image values represents an optical density of the image at one of a plurality of pixels within the image, one or more of the digital image values being subject to adjustments by a system user to modify one or more appearance characteristics associated with the image, the digital laser imager comprising a scanning laser for exposing the film to form the visible representation of the image on the film, the scanning laser being operative in response to a plurality of laser drive values, wherein each of the plurality of laser drive values controls an exposure level of the scanning laser at one of a plurality of pixels within the visible representation of the image on the film, a memory for storing a conversion table, the conversion table mapping each of the digital image values to a corresponding one of the plurality of laser drive values according to a system transfer function such that a substantially linear relationship is produced between each of the digital image values and a perceived optical density of one of the pixels corresponding to the respective one of the digital image values within the visible representation of the image on the film, and a processor for accessing the memory, converting the digital image values into the laser drive values based on the conversion table, and controlling the exposure level of the scanning laser based on the laser drive values to form the visible representation of the image on the film.

In a third embodiment, the present invention provides a digital laser imaging method comprising the steps of generating a plurality of digital image values representative of an image, each of the digital image values representing an optical density of the image at one of a plurality of pixels within the image, receiving input from a system user, the input including adjustments to the plurality of digital image values to modify one or more appearance characteristics associated with the image, and forming, based on the plurality of digital image values, a visible representation of the image on photosensitive film, the step of forming the visible representation including the steps of scanning a laser to expose the film to form the visible representation of the image on the film, the laser being operative in response to a plurality of laser drive values, wherein each of the plurality of laser drive values controls an exposure level of the laser at one of a plurality of pixels within the visible representation of the image on the film, accessing a conversion table stored in a memory, the conversion table mapping each of the digital image values to a corresponding one of the plurality of laser drive values according to a transfer function such that a substantially linear relationship is produced between each of the digital image values and a perceived optical density of one of the pixels corresponding to the respective one of the digital image values within the visible representation of the image on the film, converting the digital image values into the laser drive values based on the conversion table, and controlling the exposure level of the scanning laser based on the laser drive values to form the visible representation of the image on the film.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENT

Figure 1:
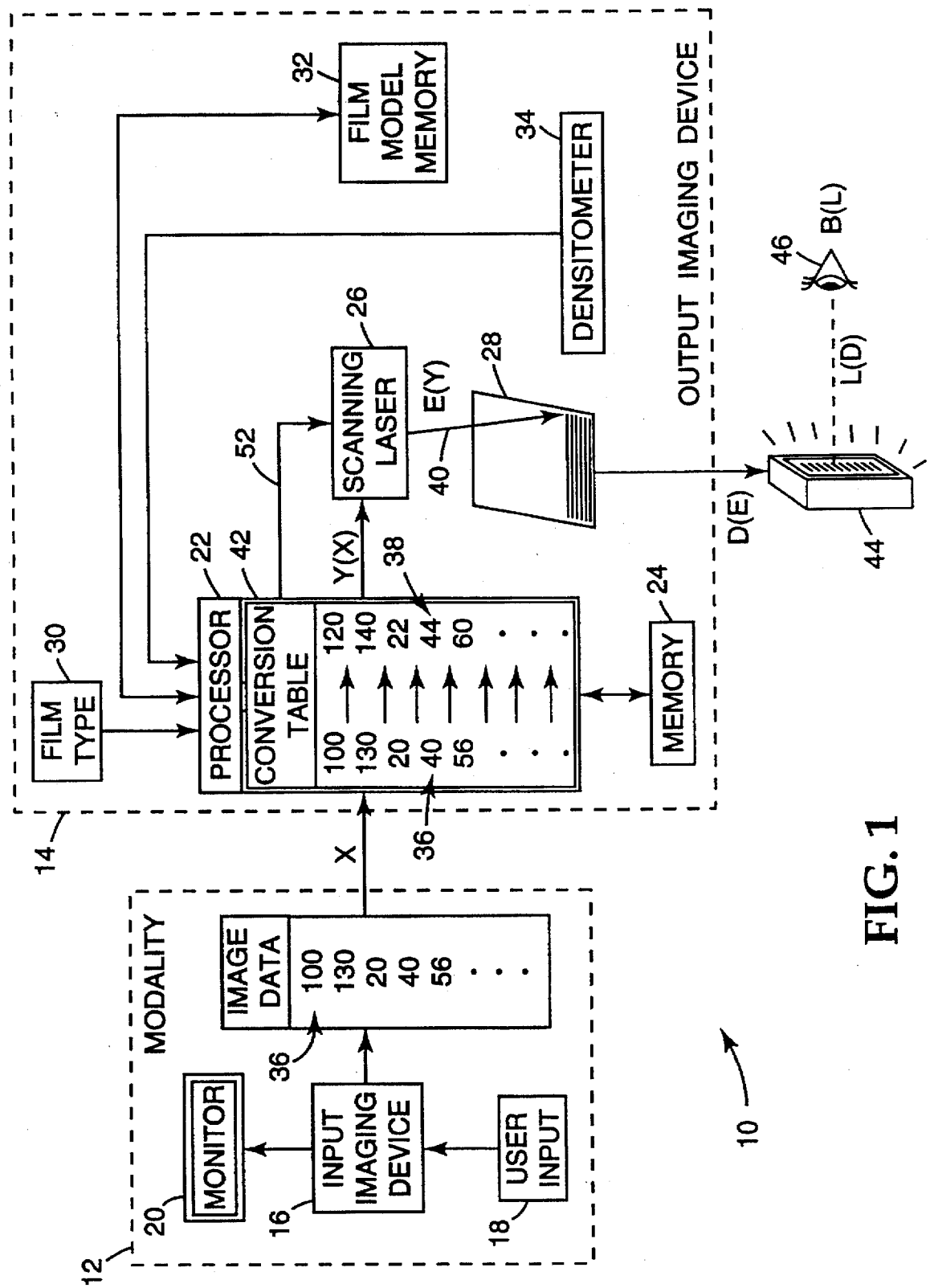
FIG. 1 is a functional block diagram of a digital laser imaging system having a linear perceived optical density interface, in accordance with the present invention.

FIG. 1 is a functional block diagram of a digital laser imaging system 10 having a linear perceived optical density interface, in accordance with the present invention. The digital laser imaging system 10 includes one or more modalities 12 and one or more output imaging devices 14. The modality 12 includes an input imaging device 16, a user input device 18, and a monitor 20. The output imaging device 14 includes a processor 22, a memory 24, a scanning laser 26 for exposing a photosensitive film 28, a film type determining device 30, a film model memory 32, and a densitometer 34.

The input imaging device 16 of modality 12 comprises, for example, a medical diagnostic imaging device such as a magnetic resonance (MR), computed tomography (CT), conventional radiography (X-ray), or ultrasound device. The input imaging device 16 acquires an image of a physical object, such as a physiological object in a medical setting, and generates image data containing a plurality of digital image values 36 representative of the image. Each of digital image values 36 represents an optical density at one of a plurality of pixels within the image.

The user input device 18 receives input from a system user and includes, for example, a keypad or control panel. The input received by user input device 18 includes adjustments to digital image values 36. The adjustments are designed to modify one or more appearance characteristics associated with an ultimate visible representation of the image on film 28. Such appearance characteristics may include, for example, a contrast level of the visible representation, an optical density level of the visible representation, or other characteristics pertinent to the display of image information useful for diagnosis. The user input device 18 enables the user to define appearance characteristics on a flexible basis, according to individual needs.

The monitor 20, which may comprise a CRT or flat-panel display, displays a visible representation of the image for viewing by the system user. The visible representation displayed by the monitor is generated based on digital image values 36, and therefore is capable of displaying adjustments to the appearance characteristics of the visible representation, entered as adjustments to digital image values 36 by the system user via user input device 18. Thus, the system user may use the display of monitor 20 as a guide, in conjunction with user input device 18, to select particular adjustments to the appearance characteristics of the visible representation of the image on film 28.

The output imaging device 14 preferably comprises a continuous tone digital laser imager. The digital laser imager 14 is configured to form, based on digital image values 36, a visible representation of the image acquired by input imaging device 12 on photosensitive film 28. The digital laser imager 14, in accordance with the present invention, receives digital image values 36 from input imaging device 12 via a buffer (not shown) associated with the laser imager. The buffer may be configured to accept digital image values 36 from input imaging device 14 on a line-by-line basis, receiving digital image values corresponding to pixels in an image scan line. For a medical diagnostic image, such as a fourteen inch wide X-ray image, for example, the line buffer can be configured to store 4096 digital image values 36 at a time, corresponding to a fourteen inch, 4096-pixel scan line of the image. Alternatively, the buffer could be configured to store an entire page of digital image values 36.

The processor 22 accesses the line buffer to obtain digital image values 36, and converts the digital image values into one of a plurality of laser drive values 38. Each of the laser drive values 38 represents an exposure level of scanning laser 26 at a particular pixel within the visible representation of the image formed on photosensitive film 28. The processor 22 applies laser drive values 38 to scanning laser 26, which preferably comprises a laser diode in combination with a scanning mechanism, to modulate the intensity of laser beam 40 as it is scanned across photosensitive film 28. The modulated intensity determines the actual exposure level delivered to photosensitive film 28 by scanning laser 26 at each pixel. Upon development, the exposure level results in a desired optical density at a particular pixel within the visible representation of the image on film 28.

The processor 22 converts digital image values 36 into laser drive values 38 by accessing a conversion table 42 stored in memory 24. Because the contents of conversion table 42 must be capable of modification by processor 22, as will be explained, memory 24 preferably comprises a random access memory (RAM). The conversion table 42 maps digital image values 36 to corresponding laser drive values 38 to realize a system transfer function. The system transfer function, in accordance with the present invention, produces a substantially linear relationship between digital image values 36 generated by input imaging device 14 and perceived optical densities of corresponding pixels within a visible representation of the image on film 28, when viewed by a human observer. Thus, conversion table 42 maps digital image values 36 to laser drive values 38 that produce perceived optical densities on film 28 that are linearly proportional to the digital image values. The mapping of digital image values 36 to laser drive values 38 to realize the system transfer function implements a direct linear perceived optical density interface between input imaging device 16 and digital laser imager 14. A direct linear perceived optical density interface provides a number of advantages.

For example, digital laser imager 16 offers a significant degree of added flexibility to a system user at modality 12. Because digital laser imager 16 produces a known, linear change in perceived optical density in response to a linear change in digital image values 36, a system user at modality 12 can achieve predictable changes in appearance characteristics by simply adjusting the digital image values via user input device 18. In this manner, the system user can adjust the appearance characteristics according to its needs, without being constrained to a set of fixed transfer functions, as would be required by previously existing laser imagers. Similarly, the system user can pre-format the digital image values at modality 12 before sending them to laser imager 16.

In addition, the linear perceived optical density system transfer function provides a single transfer function that is commonly applicable to digital image values 36 generated by any of a plurality of different input imaging devices 14. Consequently, digital laser imager 16 is "decoupled" from the characteristics of a particular modality, such that development of several modality-specific transfer functions is unnecessary. The linear perceived optical density system transfer function simply requires that the resolution of digital image values 36 generated by different input imaging devices 14 be linearly based.

Further, because the system user is capable of adjusting digital image values 36 on an ad-hoc basis to achieve desired appearance characteristics, the levels of gradation, e.g., for contrast, are limited only by the resolution of the digital image values. If monitor 20 is also configured to display a visible representation of the image based on a linear relationship between perceived optical density and digital image values 36, the system user can rely on the monitor as an indication of the appearance characteristics and formatting of the visible representation that will be produced on film 28 by laser imager 16.

Finally, because the system user makes changes in appearance characteristics and formatting at modality 12, via user input device 18, the extensive hardware previously necessary for supporting a set of fixed transfer functions and a set of fixed formatting operations is eliminated, reducing the cost and complexity of digital laser imager 16. Although digital imaging system 10 delegates responsibility for adjusting appearance characteristics to modality 12, such delegation does not simply redistribute the cost to the modality. Rather, most modalities already possess sufficient computing power, ordinarily provided by a workstation, for a user to manipulate digital image values 36 for desired appearance characteristics.

The substantially linear relationship maintained between digital image values 36 and perceived optical density, according to the system transfer function, can be illustrated by examining the series of transformations occurring in digital laser imaging system 10. With reference to FIG. 1, digital image values X are first converted into laser drive values Y(X) by processor 22 to realize the system transfer function. The laser drive values Y(X) are then applied to modulate the intensity of scanning laser 26, thereby producing exposure values E(Y) incident on photosensitive film 28. The photosensitive film 28 is then developed to produce actual optical density values D(E), which could be measured with a densitometer. The developed film 28 ultimately is placed in a light box 44 by a radiologist for viewing. The light box 44 produces visible luminance L that is limited by the density D of film 28 to form a luminance value L(D). The luminance value L(D) reaching the human eye 46 elicits a human brightness response B(L). The brightness response B(L) determines the optical density perceived by the human eye 46.

The perceived optical density is not the actual optical density D that would be measured by a densitometer, but rather the optical density perceived as a function of the human brightness response B. The human brightness response B is not linear to the actual optical density D. However, a substantially linear relationship has been observed between luminance L and the human brightness response B. Specifically, the transformation B(L) from luminance to brightness response can be expressed, to the first order and for simple responses, in the form $B=aL^p-B_o$, where a and $B_o$ are dependent on viewing conditions. See, e.g., H. W. Bodmann et at., A Unified Relationship Between Brightness and Luminance, CIE Proceedings, Kyoto Session 1979 (CIE Central Bureau, Paris 1980), pages 99–102. Bodmann et at. and others have shown that the exponent p in the above expression is roughly equal to ⅓. The expression $L^{1/3}$ therefore provides a parameter that is substantially linearly proportional to the brightness response B(L), which determines the perceived optical density of the image on film 28. The overall system transfer function between digital image values 36 and the human brightness response can be expressed as B(L(D(E(Y(X))))).

The density of film 28 produces a transmittance T that limits the degree of luminance L received by the human eye 46. The optical density perceived by the human eye is therefore determined as a function of T(L). The transmittance T essentially acts as a linear coefficient for a known luminance value L. Consequently, the expression $T^{1/3}$ also provides a parameter that is linearly proportional to the perceived optical density of the image on film 28. The digital laser imager 16 uses the linear relationship between $T^{1/3}$ and the perceived optical density as a guide for realizing the system transfer function. Specifically, the conversion table stored in memory 24 maintains a substantially linear relationship between (transmittance)$^{1/3}$ and digital image values 36. The digital laser imager 16 maintains this substantially linear relationship by generating laser drive values 38 that produce a (transmittance)$^{1/3}$ at pixels within film 28 that is substantially linear to corresponding digital image values 36 received from input imaging device 16.

The mapping specified by the conversion table stored in memory 24 is not fixed. Rather, processor 22 continuously regenerates the conversion table to compensate for variations that can affect image quality. In other words, the system transfer function serves as a target. The processor 22 continuously "zeros in" on the target by regenerating conversion table in response to variations. Without regeneration of the conversion table by processor 22, the variations would prevent accurate reproducibility of the system transfer function. Variations that can affect image quality, and thereby prevent realization of the system transfer function, include: (1) expected variations in the sensitometric response of different types of films; (2) expected variations in the sensitometric response of the same type of film from lot-to-lot; (3) unexpected variations in the sensitometric response of the same type of film from lot-to-lot; and (4) variations in film processing conditions such as the output characteristic of scanning laser 26, temperature, humidity, etc., which may affect the sensitometric response of a film. The digital laser imager 16 ensures realization of a stable and reproducible system transfer function, despite such potential variations, by the incorporation of film type determining device 30, film model memory 32, and densitometer 34, as will be explained.

The digital laser imager 16 uses film type determining device 30 and film model memory 32 as means for compensating for (1) expected variations in the sensitometric response of different types of film 28, and (2) expected variations in the sensitometric response of the same type of film from lot-to-lot. Specifically, processor 22 regenerates the conversion table stored in memory 24 by reference to a single system transfer table stored in memory 24, and one of a plurality of different film model tables stored in film model memory 32. The single transfer function table contains a linear mapping between digital image values 36 and perceived optical density, as is required by the system transfer function. Specifically, the mapping defined by the transfer function table defines a linear relationship between digital image values 36 and corresponding (transmittance)$^{1/3}$ values on film 28.

Each of the film model tables in film model memory 32 corresponds to one of a plurality of different types of film 28. The film model memory 32 may comprise a discrete memory device, but alternatively may reside in an area of memory 24 if configured as a non-volatile RAM. The different types of film 28 exhibit variations in sensitometric response to given exposure levels that can alter the system transfer function. Each of the film model tables maps a relationship between a set of exposure values, represented as a log of exposure, and expected (transmittance)$^{1/3}$ values formed on film 28 in response to such exposure values. The relationship defined in each film model table is based on the sensitometric response of the respective type of film 28.

The film model table is used to create an index table. The index table is based on the relationship between the log exposure values specified in the film model table and corresponding laser drive values of scanning laser 26 necessary to produce such log exposure values on film 28. Thus, the index table must be created based on known output characteristics of scanning laser 26 in response to a range of laser drive values 38. The output characteristics of scanning laser 26 are determined by measuring the output of the scanning laser for different laser drive values 38. The index table defines the relationship between each of the (transmittance)$^{1/3}$ values and corresponding laser drive values 38 by effectively cross-referencing the log exposure values of the film model table to the corresponding laser drive values.

Prior to the conversion of digital image values 36, and thus activation of scanning laser 26, processor 22 receives information from film type determining device 30 indicating the type and lot of film 28. The film determining device 30 may comprise, for example, a bar code scanner oriented to read a bar code on packaging associated with film 28. The bar code contains information indicating the type of film 28 and the particular lot of the film. The film type determining device 30 decodes the bar code information and transmits the film type and lot to processor 22. The processor 22 uses the type information provided by film type determining device 30 to select one of the different film model tables that corresponds to the respective type of film 28. The selected film model table may correspond to a type of film 28, or even to a particular lot, if such information is available. The film model table allows processor 22 to adjust laser drive values 38, by regeneration of the conversion table, according to the expected sensitometric response of film 28. The availability of different film model tables enables processor 22 to compensate the conversion table for variations in sensitometric response among different types and lots of film 28.

After selecting the appropriate film model table, processor 22 generates the index table by cross-referencing each of the log exposure values contained in the film model table to laser drive values 38 necessary to produce such log exposure values. The index table then defines a relationship between (transmittance)$^{1/3}$ and laser drive values 38. The processor 22 regenerates the conversion table by referencing the transfer function table to match each digital image value 36 with a (transmittance)$^{1/3}$ value, and then referencing the index table to match each resultant (transmittance)$^{1/3}$ value with a corresponding laser drive value 38. In this manner, processor 22 assembles the conversion table, mapping each of digital image values 36 with a corresponding one of laser drive values 38. The processor 22 uses the resultant conversion table to simply index each digital image value 36 with a laser drive value 38, without the need for any mathematical operations. The processor 22 the laser drive values 38 to scanning laser 26 to control the exposure level of beam 40.

Figure 2:
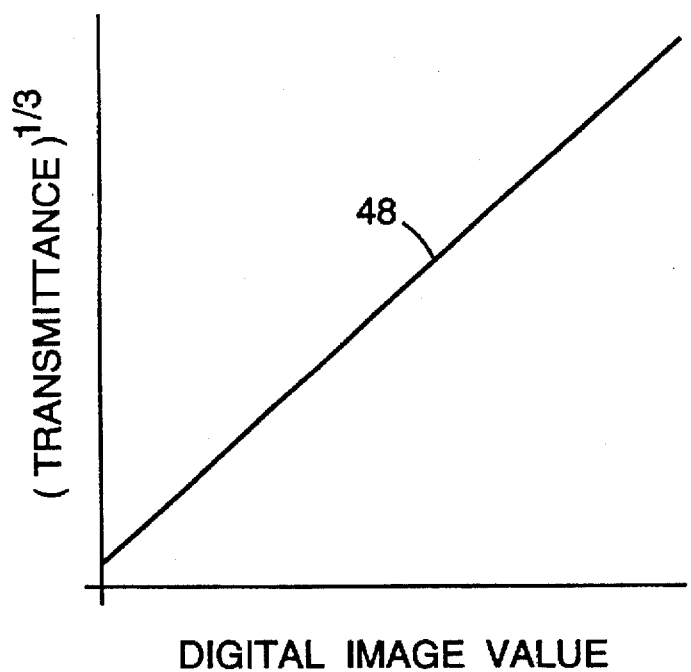
FIG. 2 is a graph illustrating a system transfer function defining a substantially linear relationship between digital image values and (transmittance)$^{1/3}$ values, in accordance with the present invention.

FIG. 2 is a graph of a curve 48 illustrating the contents of the transfer function table in terms of(transmittance)$^{1/3}$ as a function of digital image values 36. The contents of the transfer function table comprise data points along curve 48, stored as coordinates [digital image value, scaled (transmittance)$^{1/3}$]. The graph of FIG. 2 shows a substantially linear curve 48 defining the relationship between digital image values 36 and scaled (transmittance)$^{1/3}$ values, as required by the system transfer function. The lower digital values to the left represent darker optical densities on film 28 and the higher digital values to the fight represent lighter optical densities on film 28. In practice, the (transmittance)$^{1/3}$ values, on the y-axis of the graph, can be expressed as scaled cubic roots of transmittance values, with a scaling factor applied to make the values more on the order of digital image values 36.

Figure 3:
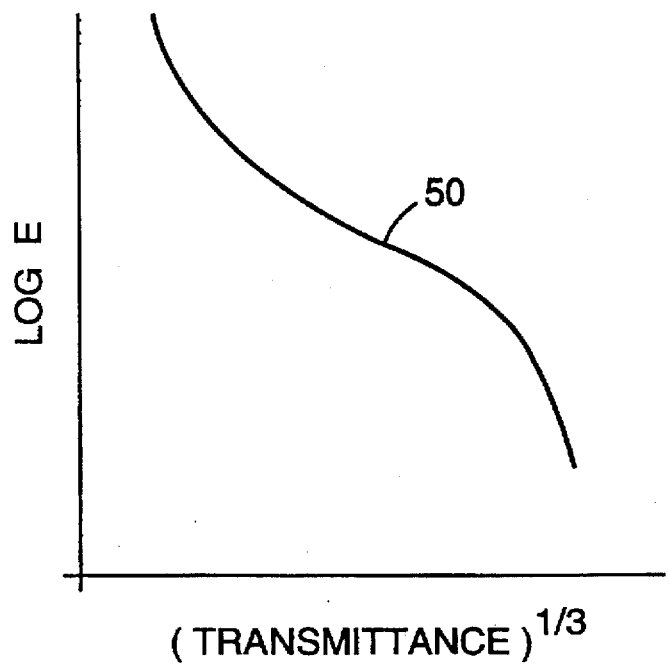
FIG. 3 is a graph illustrating a film model defining a relationship between (transmittance)$^{1/3}$ values and log exposure values, in accordance with the present invention.

FIG. 3 is a graph of a curve 50 illustrating the contents of a film model table in terms of(transmittance)$^{1/3}$ as a function of log exposure (E) for a type of film 28 having a particular sensitometric response. The contents of the film model table comprise data points along curve 50, stored as coordinates [scaled (transmittance)$^{1/3}$, log E]. The graph of FIG. 3 does not reflect a linear relationship between log exposure values and (transmittance)$^{1/3}$ values. Rather, the graph of FIG. 3 represents the relationship between log exposure values and scaled (transmittance)$^{1/3}$ values consistent with a linear relationship between digital image values 36 and (transmittance)$^{1/3}$ values for a given type of film 28.

Figure 4:
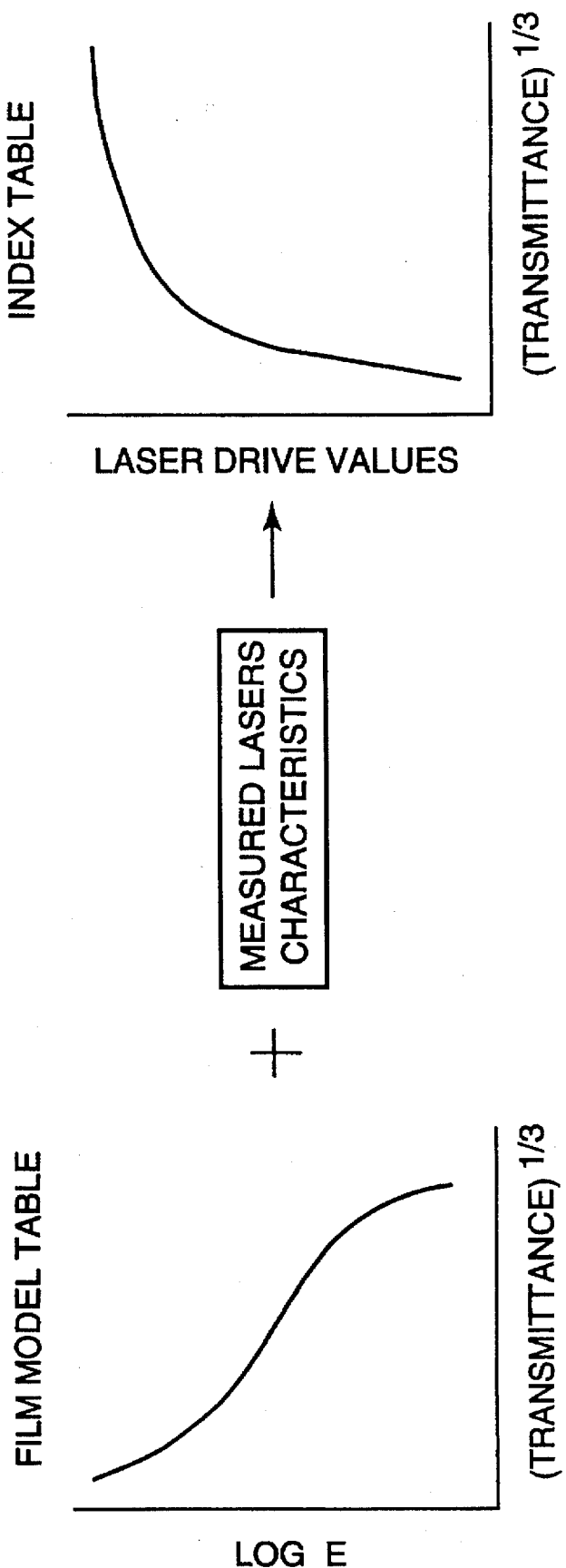
FIG. 4 is a graphical representation of a process for generating an index table, in accordance with the present invention.

FIG. 4 is a graphical representation of a process for generating the index table. As shown in FIG. 4, the film model table for a particular type of film 28 is first accessed by processor 22 to obtain the log exposure value for each (transmittance)$^{1/3}$ value. The processor 22 then determines the corresponding laser drive values 38 necessary to produce such log exposure values, based on known, measured output characteristics of scanning laser 26, and assembles the laser drive values in the index table as a function of (transmittance)$^{1/3}$.

Figure 5:
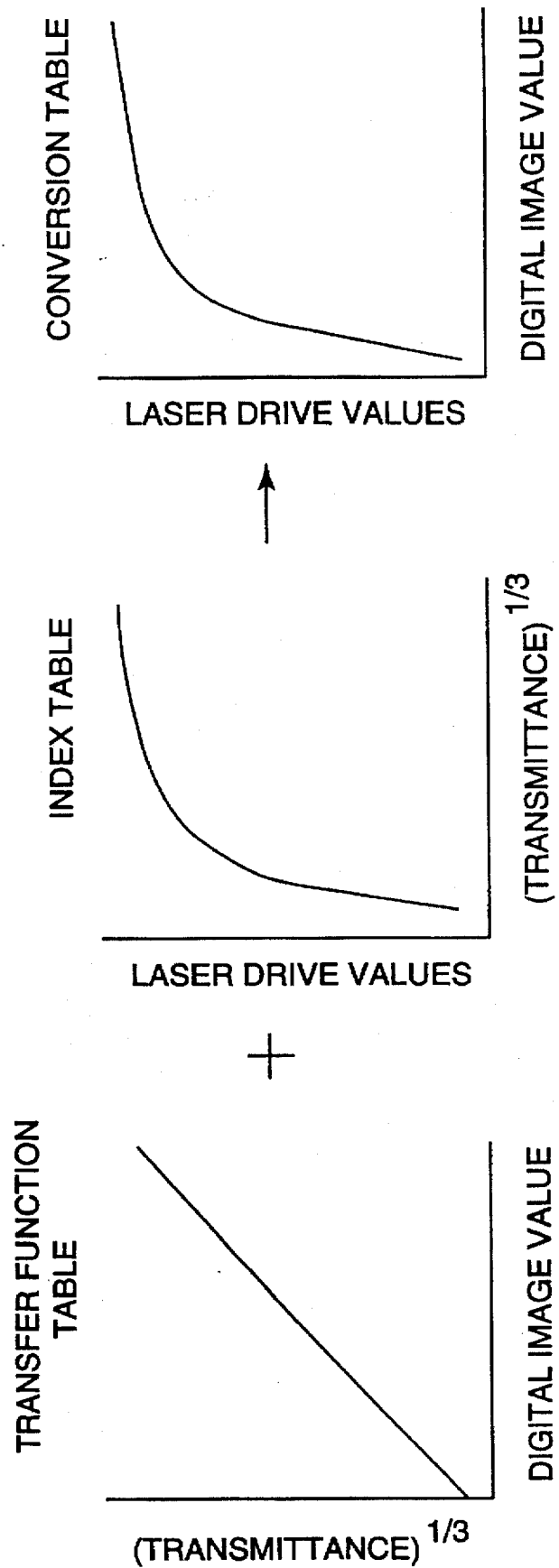
FIG. 5 is a graphical representation of a process for generating a conversion table, in accordance with the present invention.

FIG. 5 is a graphical representation of a process for generating the conversion table. As shown in FIG. 5, the transfer function table is first accessed by processor 22 to obtain the (transmittance)$^{1/3}$ values for digital image values 36. The processor 22 then accesses the index table to match each (transmittance)$^{1/3}$ value with an appropriate laser drive value 38. In this manner, processor 22 assembles the conversion table to define a relationship between the digital image values 36 and laser drive values 38.

The digital laser imager 16 uses the densitometer 34 as a means for compensating for (3) unexpected variations in the sensitometric response of the same type of film 28 from lot-to-lot, and (4) variations in film processing conditions. Specifically, prior to conversion of digital image values 36, processor 22 may initiate either a density patch calibration procedure or a wedge calibration procedure involving measurements by densitometer 34. A suitable embodiment of densitometer 34 is disclosed, for example, in U.S. Pat. No. 5,117,119, to Lemberger et al. A density patch calibration procedure is initiated for each sheet of film 28 to be imaged. A wedge calibration procedure, however, is initiated when: (1) a new type of film is loaded into digital laser imager 16, as indicated by film type determining device 30; (2) a predetermined time has elapsed between the formation of consecutive prints; (3) the density patch calibration procedure, to be explained, indicates that an unacceptably large shift in exposure level is require to achieve nominal patch density; or (4) a user requests a wedge calibration procedure by actuating a control panel associated with the digital laser imager. Density patch and wedge calibration techniques, suitable for use in the digital laser imaging system 10 of the present invention, are disclosed in copending U.S. patent application Ser. No. 07/981,075, of Schubert et al., the entire content of which is incorporated herein by reference.

To facilitate the wedge calibration procedure, a range of calibration laser drive values corresponding to a range of expected exposure values are stored in memory 24. During the wedge calibration procedure, processor 22 accesses memory 24 to obtain the calibration laser drive values, and controls scanning laser 26 according to the calibration laser drive values to form a sequence of density patches on film 28. The imaged film 28 is then developed by a film processing system associated with digital laser imager 16, and the actual optical densities of the density patches are measured by densitometer 34. The densitometer 34 transmits the measured density values to processor 22, which compares measured densities to expected density values also stored in memory 24. The expected density values reflect the ideal values that would be produced according to the system transfer function in the absence of variations in environmental and/or film characteristics. If the measured optical density values deviate from the expected values, processor 22 adjusts the log exposure values in the appropriate film model table. In this manner, processor 22 is able to effect an adjustment of laser drive values 38 during the next regeneration of the conversion table to compensate for the deviation. Thus, processor adjusts laser drive values 38 by adjusting the film model table applicable to the film being imaged, and then regenerates the conversion table by referencing the transfer function table and the adjusted film model table. The processor 22 thereby maintains the linear relationship between digital image values 36 and perceived optical density, as dictated by the system transfer function.

The digital laser imager 16 initiates the density patch calibration procedure to compensate for relatively long-term drift in the overall system transfer function. The digital laser imager 16 initiates the density patch calibration during the imaging of each sheet of film 28, and compensates for drifts by adjusting an attenuator (not shown) associated with scanning laser 26. Thus, the density patch calibration procedure does not result in adjustment of the film model tables in film model memory 32. Memory 24 includes stored density patch laser drive values calculated to produce a particular patch density. The processor 22 initiates the density patch calibration procedure by accessing memory 24 to obtain the density patch laser drive values, and then controlling scanning laser 26 according to the density patch laser drive values to form a single density patch on an edge of film 28. The film 28 is then developed, and the density of the patch is measured by densitometer 34. The processor 22 compares the measured density to an expected density stored in memory 24, and controls the attenuator of scanning laser 26, as indicated by line 52 in FIG. 1, as a function of the comparison to minimize the differences in density during subsequent density patch calibration procedures.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A digital laser imaging system comprising:
   an input imaging device for generating a plurality of digital image values representative of an image, each of said digital image values representing an optical density of said image at one of a plurality of pixels within said image;
   a user input device, coupled to said input imaging device, for receiving input from a system user, said input including adjustments to said plurality of digital image values to modify one or more appearance characteristics associated with said image; and
   a laser imager, coupled to receive said plurality of digital image values, for forming, based on said plurality of digital image values, a visible representation of said image on photosensitive film, said laser imager including:
      a scanning laser for exposing said film to form said visible representation of said image on said film, said scanning laser being operative in response to a plurality of laser drive values, wherein each of said plurality of laser drive values controls an exposure level of said scanning laser at one of a plurality of pixels within said visible representation of said image on said film, a memory for storing a single conversion table, said conversion table mapping each of said digital image values to a corresponding one of said plurality of laser drive values according to a system transfer function such that a substantially linear relationship is produced between each of said digital image values and a perceived optical density of one of said pixels corresponding to the respective one of said digital image values within said visible representation of said image on said film, and a processor for accessing said memory, converting said digital image values into said laser drive values based on said conversion table, and controlling the exposure level of said scanning laser based on said laser drive values to form said visible representation of said image on said film.

2. The digital laser imaging system of claim 1, wherein said input imaging device includes a plurality of different input imaging devices, each of said different input imaging devices generating a plurality of digital image values representative of an image, and said conversion table stored by said memory is representative of a single system transfer function commonly applicable to said digital image values generated by each of said different input imaging devices, said processor converting said digital image values generated by each of said different input imaging devices into said laser drive values based on said conversion table.

3. The digital laser imaging system of claim 1, wherein said conversion table maps said digital image values to said corresponding laser drive values according to said system transfer function such that a substantially linear relationship is produced between each of said digital image values and an expected brightness response of a human observer to one of said pixels corresponding to the respective one of said digital image values within said visible representation of said image on said film.

4. The digital laser imaging system of claim 1, wherein said conversion table maps said digital image values to said corresponding laser drive values according to said system transfer function such that a substantially linear relationship is produced between each of said digital image values and a cubic root of an expected transmittance value of one of said pixels corresponding to the respective one of said digital image values within said visible representation of said image on said film.

5. The digital laser imaging system of claim 1, further comprising a film model memory for storing a plurality of film model tables, each of said film model tables corresponding to one of a plurality of different types of said film, wherein each of said film model tables represents a relationship between each of said plurality of exposure values and an expected optical density of the respective type of said film in response to the respective one of said exposure values, said processor adjusting said conversion table based on one of said film model tables.

6. The digital laser imaging system of claim 5, further comprising means for determining the type of said film, said processor adjusting said conversion table based on one of said film model tables corresponding to the determined type of said film.

7. The digital laser imaging system of claim 6, further comprising a densitometer for measuring an actual optical density of at least a portion of said film, said processor adjusting one of said film model tables corresponding to the determined type of said film based on the measurement by said densitometer.

8. The digital laser imaging system of claim 1, wherein said input imaging device includes a medical diagnostic imaging device, said image representing a physiological object.

9. A digital laser imaging method comprising the steps of:

generating a plurality of digital image values representative of an image, each of said digital image values representing an optical density of said image at one of a plurality of pixels within said image;

receiving input from a system user, said input including adjustments to said plurality of digital image values to modify one or more appearance characteristics associated with said image; and forming, based on said plurality of digital image values, a visible representation of said image on photosensitive film, said step of forming said visible representation including the steps of:

scanning a laser to expose said film to form said visible representation of said image on said film, said laser being operative in response to a plurality of laser drive values, wherein each of said plurality of laser drive values controls an exposure level of said laser at one of a plurality of pixels within said visible representation of said image on said film, accessing a memory storing a single conversion table, said conversion table mapping each of said digital image values to a corresponding one of said plurality of laser drive values according to a transfer function such that a substantially linear relationship is produced between each of said digital image values and a perceived optical density of one of said pixels corresponding to the respective one of said digital image values within said visible representation of said image on said film, converting said digital image values into said laser drive values based on said single conversion table, and controlling the exposure level of said scanning laser based on said laser drive values to form said visible representation of said image on said film.

10. The digital laser imaging method of claim 9, wherein said step of generating said plurality of digital image values includes generating said plurality of digital image values via a plurality of different input imaging devices, said conversion table stored by said memory being representative of a single transfer function commonly applicable to said digital image values generated by each of said different input imaging devices, wherein said step of converting said digital image values includes converting said digital image values generated by each of said different input imaging devices into said laser drive values based on said conversion table.

11. The digital laser imaging method of claim 9, wherein said conversion table maps said digital image values to said corresponding laser drive values according to said transfer function such that a substantially linear relationship is produced between each of said digital image values and an expected brightness response of a human observer to one of said pixels corresponding to the respective one of said digital image values within said visible representation of said image on said film.

12. The digital laser imaging method of claim 9, wherein said conversion table maps said digital image values to said corresponding laser drive values according to said transfer function such that a substantially linear relationship is produced between each of said digital image values and a cubic root of an expected transmittance value of one of said pixels corresponding to the respective one of said digital image values within said visible representation of said image on said film.

13. The digital laser imaging method of claim 1, further comprising the steps of accessing a plurality of film model tables stored in a film model memory, each of said film model tables corresponding to one of a plurality of different types of said film, wherein each of said film model tables represents a relationship between each of a plurality of exposure values and an expected optical density of the respective type of said film in response to the respective one of said exposure values, and adjusting said conversion table based on one, of said film model tables.

14. The digital laser imaging method of claim 13, further comprising the step of determining the type of said film, wherein said step of adjusting said conversion table includes adjusting said conversion table based on one of said film model tables corresponding to the determined type of said film.

15. The digital laser imaging method of claim 14, further comprising the step of measuring an actual optical density of at least a portion of said film, said step of adjusting said conversion table including adjusting one of said film model tables corresponding to the determined type of said film based on the measurement by said densitometer.

16. The digital laser imaging method of claim 9, wherein said input imaging device includes a medical diagnostic imaging device, said image representing a physiological object.

17. A digital laser imager comprising:

a scanning laser for exposing a photosensitive film to form a visible representation of an image on said film, said scanning laser being operative in response to a plurality of laser drive values, wherein each of said plurality of laser drive values controls an exposure level of said scanning laser at one of a plurality of pixels within said visible representation of said image on said film;

a memory for storing a single conversion table, said conversion table mapping each of a plurality of digital image values to a corresponding one of said plurality of laser drive values, wherein each of said digital image values represents an optical density of said image at one of a plurality of pixels within said image, said digital image values being mapped to said laser drive values according to a system transfer function such that a substantially linear relationship is produced between each of said digital image values and a perceived optical density of one of said pixels corresponding to the respective one of said digital image values within said visible representation of said image on said film; and a processor for accessing said memory, converting said digital image values into said laser drive values based on said conversion table, and controlling the exposure level of said scanning laser based on said laser drive values to form said visible representation of said image on said film.

* * * * *